United States Patent
Fairley (10) Patent No.: US 9,864,045 B2
(45) Date of Patent: Jan. 9, 2018

(54) RADAR RECEIVERS

(71) Applicant: MBDA UK LIMITED, Stevenage, Hertfordshire (GB)

(72) Inventor: Martin George Fairley, Stevenage (GB)

(73) Assignee: MBDA UK LIMITED, Stevenage, Hertfordshire (GB)

( * ) Notice: Subject to any disclaimer, the term of this patent is extended or adjusted under 35 U.S.C. 154(b) by 265 days.

(21) Appl. No.: 14/434,163

(22) PCT Filed: Oct. 8, 2013

(86) PCT No.: PCT/GB2013/000421
§ 371 (c)(1),
(2) Date: Apr. 8, 2015

(87) PCT Pub. No.: WO2014/057234
PCT Pub. Date: Apr. 17, 2014

(65) Prior Publication Data
US 2015/0293209 A1    Oct. 15, 2015

(30) Foreign Application Priority Data

Oct. 8, 2012  (EP) ...................................... 12275157
Oct. 8, 2012  (GB) ................................... 1217939.6

(51) Int. Cl.
*G01S 7/285*  (2006.01)
*G01S 7/288*  (2006.01)
(Continued)

(52) U.S. Cl.
CPC .......... *G01S 7/288* (2013.01); *G01S 13/0209* (2013.01); *G01S 13/44* (2013.01); *G01S 13/449* (2013.01);
(Continued)

(58) Field of Classification Search
CPC .. G01S 7/285; G01S 2007/2886; G01S 7/288; G01S 13/449
(Continued)

(56) References Cited

U.S. PATENT DOCUMENTS 5,719,580 A * 2/1998 Core .................... G01S 7/4008
342/100
6,061,551 A   5/2000 Sorrells et al.
(Continued)

FOREIGN PATENT DOCUMENTS

EP  2131209 A1  12/2009
GB  2452415 A   3/2009

OTHER PUBLICATIONS

International Preliminary Report on Patentability together with the Written Opinion dated Apr. 16, 2015 received in related application PCT/GB2013/000421.
(Continued)

*Primary Examiner* — Marcus E Windrich
(74) *Attorney, Agent, or Firm* — Scully, Scott, Murphy & Presser, PC (57) ABSTRACT

A radar receiver includes an analogue receiver for receiving a radar echo signal and a digital receiver. The digital receiver includes an analogue-to-digital converter arranged to receive and sample an IF analogue signal from the analogue receiver. The sampling is undersampling according to the Nyquist criterion, so that a plurality of IF digital signals are produced, in different Nyquist zones, including one or more aliased IF digital signals. The digital receiver is arranged to select an IF digital signal from the one or more aliased digital signals.

13 Claims, 9 Drawing Sheets

(51) Int. Cl.
*G01S 13/44* (2006.01)
*G01S 13/02* (2006.01)

(52) U.S. Cl.
CPC ............... *G01S 2007/2886* (2013.01); *G01S 2013/0245* (2013.01)

(58) Field of Classification Search
USPC .......................................... 342/21, 194, 195
See application file for complete search history.

(56) References Cited

U.S. PATENT DOCUMENTS

| | | | | |
|---|---|---|---|---|
| 6,667,715 B1* | 12/2003 | Chang | ............... | H01Q 1/288 342/373 |
| 6,864,827 B1* | 3/2005 | Tise | ............... | G01S 7/288 342/194 |
| 7,002,511 B1* | 2/2006 | Ammar | ............... | G01S 7/032 342/118 |
| 7,136,430 B2* | 11/2006 | Morris | ............... | H03M 7/3028 375/147 |
| 8,149,894 B2* | 4/2012 | Fudge | ............... | H04B 1/7136 375/133 |
| 8,660,218 B2* | 2/2014 | Maleh | ............... | G01R 23/16 375/316 |
| 2002/0012200 A1 | 1/2002 | Boutaghou et al. | | |
| 2003/0020653 A1* | 1/2003 | Baugh | ............... | G01S 7/285 342/451 |
| 2007/0081578 A1* | 4/2007 | Fudge | ............... | H04B 1/0003 375/130 |
| 2007/0103362 A1* | 5/2007 | Arikan | ............... | G01S 13/524 342/195 |
| 2007/0186678 A1* | 8/2007 | Griessbaum | ............... | G01F 23/284 73/861 |
| 2013/0120185 A1* | 5/2013 | Kishigami | ............... | G01S 7/2813 342/146 |
| 2014/0077989 A1* | 3/2014 | Healy, Jr. | ............... | G01S 13/9035 342/25 F |

OTHER PUBLICATIONS

International Search Report dated Jan. 27, 2014 issued in PCT/GB2013/000421.
Extended European Search Report dated Mar. 6, 2013 issued in EP 12275157.1.
UK Search Report dated Jan. 18, 2013 issued in GB 1217939.6.
Patton, Lee K., "A GNU Radio Based Software-Defined Radar", Apr. 9, 2007, retrieved from: http://rave.ohiolink.edu/etdc/view?acc_num=wright1176142845.

* cited by examiner

RADAR RECEIVERS

FIELD OF THE INVENTION

This invention relates to the field of radar receivers, and in particular to radar receivers for a Doppler radar system. The invention is especially useful in Doppler radar systems employing phase-coded pulse compression, but the invention is not limited to such radar systems. The invention is especially useful in monopulse Doppler radar systems, but the invention is not limited to such radar systems.

BACKGROUND ART

In a Doppler radar system, pulses are transmitted and echoes are received from radar-reflecting objects within range of the radar system. The echo pulses received are demodulated and in-phase and quadrature (I & Q) signals are derived. The I & Q signals are duplicate copies of the demodulated signal with a phase difference of exactly 90° between them. The I & Q signals form a complex-number phasor that is processed using a Fourier transform to obtain a Doppler spectrum of the echo signal. In the Doppler spectrum, closing and receding targets correspond to positive and negative Doppler frequencies, respectively. (A receiver system that does not produce I & Q components is typically unable to distinguish between positive and negative frequencies, and is therefore unable to determine if the target is approaching or receding.)

Figure 1:
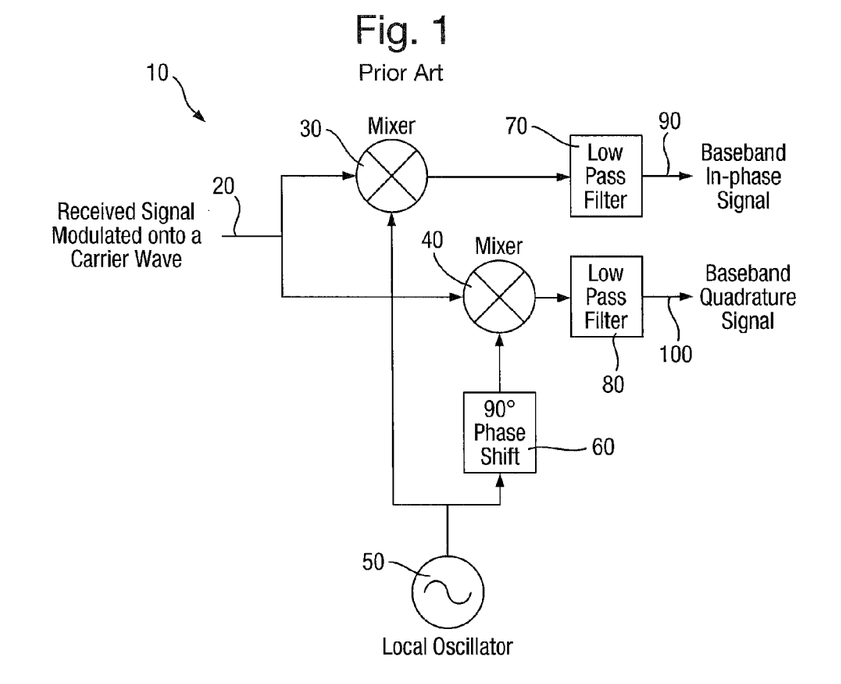
FIG. 1 is a block diagram showing a prior-art arrangement for forming in-phase and quadrature baseband signals from a received signal modulated onto a carrier wave.

The I & Q demodulation is conventionally performed using an arrangement such as that shown in FIG. 1. In this arrangement 10, the received signal 20, modulated onto a carrier wave, is split between a first mixer 30 and a second mixer 40. At the first mixer 30, the signal 20 is mixed with a local oscillator signal 50 from a local oscillator at the frequency of the carrier wave. At the second mixer 40, the signal 20 is mixed with the local oscillator signal from the local oscillator 50, but before the mixing a 90 degree phase shift is introduced into the local oscillator signal. The outputs from the first and second mixers 30, 40 are filtered by first and second low-pass filters 70, 80, respectively, to produce a baseband in-phase signal 90 from the first mixer 30 and first low-pass filter 70 and a baseband quadrature signal 100 from the second mixer 40 and the second low-pass filter 80. Thus, the signal 20 is split into two pathways, one of which is multiplied by a sine wave in a first superheterodyne mixing stage at the first mixer 30, and the other of which is multiplied by a cosine wave in a second superheterodyne mixing stage at the second mixer 40. This arrangement thus translates the carrier frequency to baseband (i.e. 0 Hz carrier signal), and achieves the required 90° phase shift between the two pathways.

However, the arrangement of FIG. 1 can suffer from problems in practice, because, for proper operation, the two receiver pathways need to be closely matched in gain and phase. Any mismatch in gain or phase between the channels will result in a spurious image of the target at a frequency which is the negative of the target frequency. The need for close match in gain and phase usually results in a need for the receiver to undergo a calibration process before it can be used. Often that calibration is not completely successful, for example because the gain and phase imbalance changes with temperature and so the calibration becomes invalid as the system heats up.

A further disadvantage of the arrangement of FIG. 1 is that it requires a significant number of components.

In a traditional monopulse angle-of-arrival measurement system, the radar receiver produces a sum channel and two difference channels (azimuth and elevation in an airborne radar, or elevation and traverse in a ground-based radar). In conventional monopulse radar systems, the sum and difference of four antenna feed apertures at the output port of the radar antenna are provided by a large, heavy and relatively expensive microwave comparator unit (a summing and differencing junction implemented in a waveguide).

Figure 2:
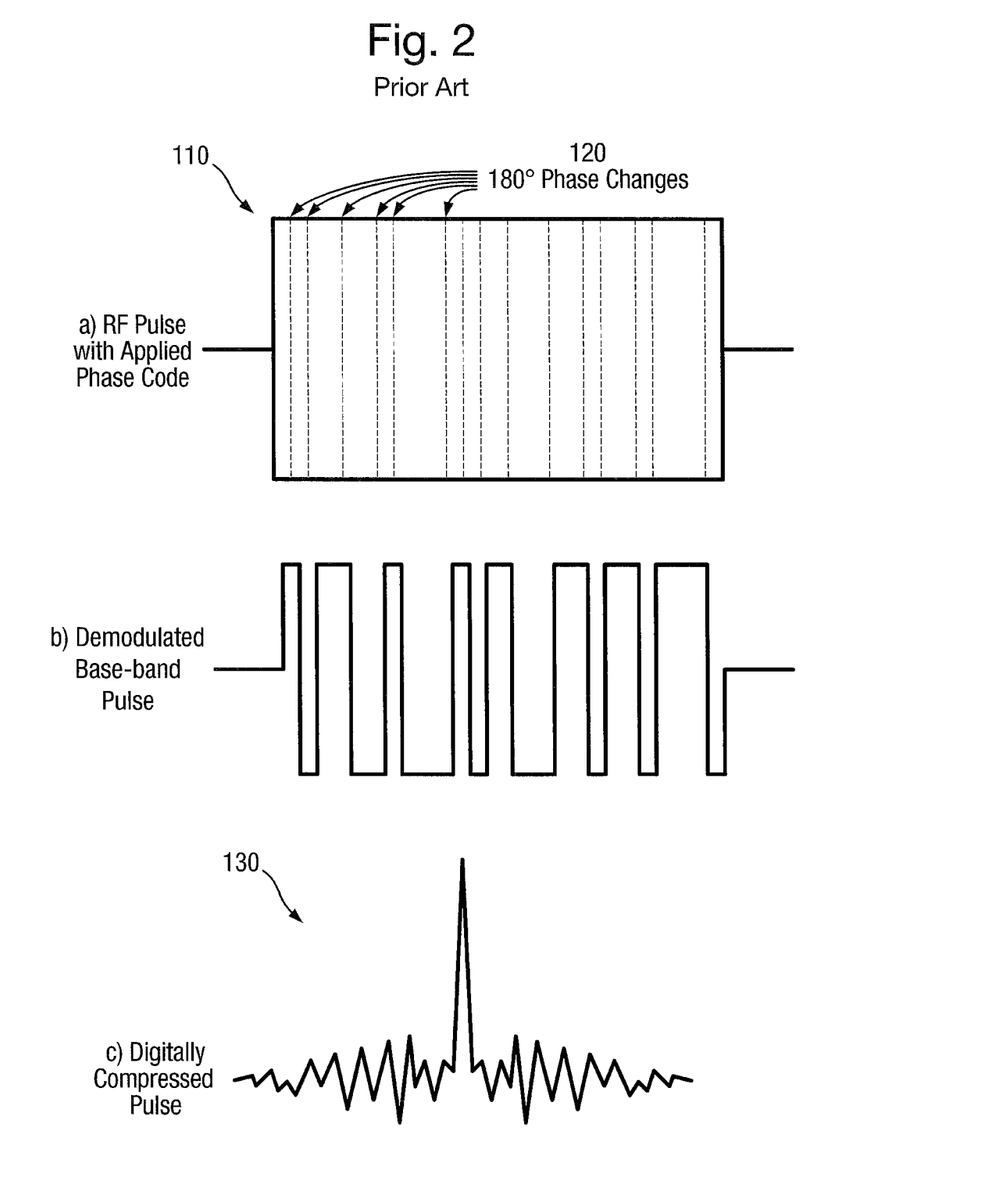
FIG. 2 is an illustration of the prior-art technique of phase coding, being (a) a schematic illustration of an RF pulse with an applied phase code, (b) the demodulated baseband pulse corresponding to that phase code, and (c) a compressed pulse resulting from cross-correlation of the transmitted and received pulses.

In phase-coded pulse compression, transmit pulses are phase-coded to allow pulse compression in the radar receiver. Phase coding of radar pulses is a well-known technique for achieving high resolution while at the same time retaining adequate signal-to-noise ratio. The operation of the technique is illustrated in FIG. 2. The transmitted RF pulse 110 has its phase switched between 0° and 180° in a randomised pattern 120 (FIG. 2(*a*)), resulting in an RF pulse with an applied phase code. In the receiver the carrier signal is stripped off leaving the originally applied code sequence (FIG. 2(*b*)), i.e. a demodulated baseband pulse. This code sequence is then compared with the phase code applied to the transmit pulse 110, in a correlator device which calculates the cross-correlation function of the transmitted and received pulses, producing a compressed pulse 130 (FIG. 2(*c*)) with a resolution equal to the duration of one of the phase code digits.

Lee K. Patton, in "A GNU Radio Based Software-Defined Radar", 9 Apr. 2007 (see http://rave.ohiolink.edu/etdc/view?acc_num=wright1176142845) describes a software defined radio that can be used to create a plurality of different radar systems. At page 6 it describes a software-defined radio including (i) a receiver in which a received signal is converted from its carrier frequency to an intermediate frequency or to baseband and (ii) a transmitter in which a transmit signal is converted from an intermediate frequency or baseband to the desired carrier frequency. In both the receiver and the transmitter, an analogue-to-digital converter or digital-to-analogue converter is said to need only to convert the signal over its modulation bandwidth, and not the entire bandwidth from DC to carrier, if the signal is at baseband. At the intermediate frequency, the system must convert the signal from DC to the intermediate frequency plus the upper half of the modulation bandwidth, although Patton says that even in this case a lower rate ADC/DAC can be used.

US 2003/020653A1 (Baugh et al.) describes a system and method for narrowband pre-detection signal processing for passive coherent location applications.

EP2131209A1 (Saab AB) describes a radar receiver for processing arbitrary waveforms, in particular from a noise radar. The document is concerned with how to apply the double spectral processing used in noise radar systems to a wideband digital radar system. A waveform generator generates an arbitrary noise waveform having a flattened frequency spectrum. An undersampling analogue-to-digital converter is used to fold back the wide frequency band of the analogue wide-band radar return waveform into the baseband of said converter. Spectral processing is performed on the power spectrum of the undersampled digital wide-band waveform in order to obtain a discrete ripple frequency power spectrum. Ripple frequencies indicating radar targets are located in the discrete ripple frequency power spectrum. The ripple frequencies are said to remain basically unaffected by the aliasing caused by the undersampling, and therefore to be identifiable in the discrete ripple frequency power spectrum of the undersampled digital radar waveform.

US 2002/012200A1 (Bradley et al.) describes a ground penetrating radar system, including an RF module and a digital module.

It would be advantageous to provide a Doppler radar receiver in which one or more of the aforementioned disadvantages is eliminated or at least reduced.

DISCLOSURE OF THE INVENTION

A first aspect of the invention provides a radar receiver comprising:
(a) an analogue receiver unit for receiving a radar echo signal and arranged to convert the radar echo signal into an intermediate frequency (IF) analogue signal; and
(b) a digital receiver including an analogue-to-digital converter arranged to receive the IF analogue signal from the analogue receiver and to sample the IF analogue signal, wherein the sampling by the analogue-to-digital converter is undersampling according to the Nyquist criterion, so that a plurality of IF digital signals are produced, in different Nyquist zones, including one or more aliased IF digital signals, the digital receiver being arranged to select an IF digital signal from the one or more aliased digital signals.

By using a digital receiver stage, the need for analogue matching of the I and Q receiver paths in gain and phase is eliminated. In example embodiments of the invention, the number of components required to implement the receiver is reduced compared with the number of components required to implement prior-art receivers, reducing cost.

The skilled person will understand that undersampling according to the Nyquist criterion is sampling at a sample rate that is less than twice the highest frequency of the (IF analogue) signal being sampled. Undersampling results in aliasing, i.e. it results in copies of the signal being produced in the digital sample stream in different Nyquist zones, i.e. in frequency zones extending between integer multiples of half the sampling frequency (i.e. a first Nyquist zone extending from 0 Hz to half the sampling frequency, a second Nyquist zone extending from half the sampling frequency to the sampling frequency, a third Nyquist zone extending from the sampling frequency to one-and-a-half times the sampling frequency, and so on).

In the radar receiver of the invention, the undersampling may result in an alias copy of the IF signal being produced in the digital sample stream at a frequency lower than the frequency of the IF analogue signal. Thus, the analogue-to-digital converter may function as a frequency down-converter. It may be that the selected IF digital signal is from the first Nyquist zone. It may be that the carrier frequency of the IF analogue signal is set so that the difference between that carrier frequency and the sampling frequency of the analogue-to-digital converter is the same as the desired carrier frequency of the selected IF digital signal, such that the selected digital signal is in the first Nyquist zone.

It may be that the analogue receiver unit includes an anti-aliasing filter. It may be that the analogue receiver unit includes a pulse-shaping filter. It may be that the analogue receiver unit includes a filter that is both an anti-aliasing filter and a pulse-shaping filter. It may be that the filter is configured to increase the signal-to-noise ratio of the IF analogue signal. It may be that the filter has a pass-band that is broad enough to pass the main lobe of the single-pulse spectrum of the IF analogue signal. It may be that the filter provides at least 10 dB of rejection at the lower and upper Nyquist frequencies of the IF analogue signal. It may be that the filter reduces, or preferably substantially eliminates, aliasing of noise in the IF analogue signal. It may be that the anti-aliasing filter includes a Bessel filter. The Bessel filter may be configured to reduce, preferably to minimise, the group delay of the filter.

It may be that the radar receiver includes a digital filter to filter out all of the plurality of IF digital signals except for the selected IF digital signal.

It may be that the radar receiver includes a digital demodulator arranged to convert the selected IF digital signal to a baseband digital signal having in-phase (I) and quadrature (Q) components. It may be that the I and Q components are produced by multiplying the selected IF digital signal by a cosine signal and by a sine signal, respectively. It may be that the sine and cosine functions are each represented by a stream consisting only of three levels (for example 1s, −1s and 0s), corresponding to maxima, minima, and zeros of the functions, respectively.

The radar receiver may further comprise a digital filter arranged to reduce the bit rate of the baseband digital signal. It may be that the digital filter arranged to reduce the bit rate is configured to implement a passband having a raised cosine shape. It may be that the digital filter arranged to reduce the bit rate is a symmetrical Finite-Impulse-Response (FIR) filter.

The radar receiver may include a digital interpolator configured to calculate, by interpolation, a substitute value for bits, in the baseband digital signal, having a zero value resulting from the sampling. It may be that the radar receiver is configured so that the digital interpolator is upstream (i.e. closer to the antenna in the receiver path) of the digital filter arranged to reduce the bit rate of the baseband signal, if that digital filter is present. It may be that the digital interpolator is configured also to function as a low-pass filter.

The radar receiver may include a digital balancer configured to remove or reduce gain and/or phase imbalance in the baseband digital signal. It may be that the digital balancer is downstream of the filter arranged to reduce the bit rate of the baseband digital signal. It may be that the digital balancer is arranged to multiply the I and Q components of the baseband digital signal by respective gain correction rescaling factors. It may be that the digital balancer is arranged to multiply the I and Q components of the baseband digital signal by phase correction rotation.

It may be that the radar receiver includes a plurality of receiver channels, which may have an identical or substantially identical configuration, comprising an analogue receiver unit and a digital receiver unit, as described above, with the digital receiver optionally including one, two or more or all units selected from the following: the digital demodulator, the digital filter arranged to reduce the bit rate of the selected IF digital signal, the digital interpolator and the digital balancer.

The radar receiver may include a digital beam-forming network arranged to receive a plurality of the baseband digital signals, from each of the plurality of receiver channels, and to convert them into a plurality of comparison signals each on one of a plurality of comparison channels, which may for example be or include a sum channel, an azimuthal difference channel, an elevation difference channel and/or a diagonal difference channel.

Providing a digital means of obtaining sum and difference channels for monopulse angle of arrival measurement eliminates the need for the large and heavy microwave comparator required in prior-art systems, and so allows the resulting radar to be smaller, lighter, and cheaper to manufacture.

The digital beam-forming network may comprise a plurality of summing units and difference units, arranged to calculate the sums and differences of combinations of the signals from the receiver channels.

It may be that each comparison channel includes a digital frequency translation unit, configured to remove or reduce any Doppler shift on the comparison signal. The digital frequency translation unit may include a Doppler correction parameter generation sub-stage, which generates a Doppler correction parameter to be applied to the I and Q channels of the comparison signals. It may be that the Doppler correction parameter is applied by multiplying the I and Q components of the baseband digital signal by Doppler phase correction rotation.

It may be that each comparison channel includes a digital correlator arranged to form a cross-correlation function between the comparison signal and a code applied to pulses transmitted by the radar.

It may be that the radar is a pulsed radar. It may be that the pulses have no intra-pulse modulation. It may be that the pulses have phase-coding of either bi-phase or quad-phase. It may be that the pulses have a linear frequency modulation (i.e. a chirp).

The radar receiver may be a pulse-Doppler radar receiver.

The radar receiver may be a monopulse radar receiver.

The radar receiver may use phase-coded pulse compression.

It may be that the analogue-to-digital converter has a sample rate that is 4 times the local oscillator frequency of the digital demodulator.

It may be that the intermediate frequency analogue signal is 4n+1 times the local oscillator frequency of the digital demodulator, where n is any integer.

It may be that the analogue-to-digital converter has a sample rate that is equal to: an integer greater than 4, divided by the duration of the digits of an imposed phase code.

It may be that: the intermediate frequency analogue signal is 4n+1 times the local oscillator frequency of the digital demodulator, where n is any integer; and the analogue-to-digital converter has a sample rate that is 4 times the local oscillator frequency of the digital demodulator and equal to: an integer greater than 4, divided by the duration of the digits of an imposed phase code.

A second aspect of the invention provides a method of processing a radar signal, comprising:
(a) receiving a radar echo signal and converting the radar echo signal into an intermediate frequency (IF) analogue signal; and
(b) sampling the IF analogue signal, wherein the sampling is undersampling according to the Nyquist criterion, so that one or more aliased IF digital signals is produced; and
(c) selecting an IF digital signal from the one or more aliased digital signals.

It will of course be appreciated that features described in relation to one aspect of the present invention may be incorporated into other aspects of the present invention. For example, the method of the invention may incorporate any of the features described with reference to the system of the invention and vice versa.

BRIEF DESCRIPTION OF THE DRAWINGS

Example embodiments of the invention will now be described by way of example only and with reference to the accompanying schematic drawings, of which.

DETAILED DESCRIPTION

Figure 3:
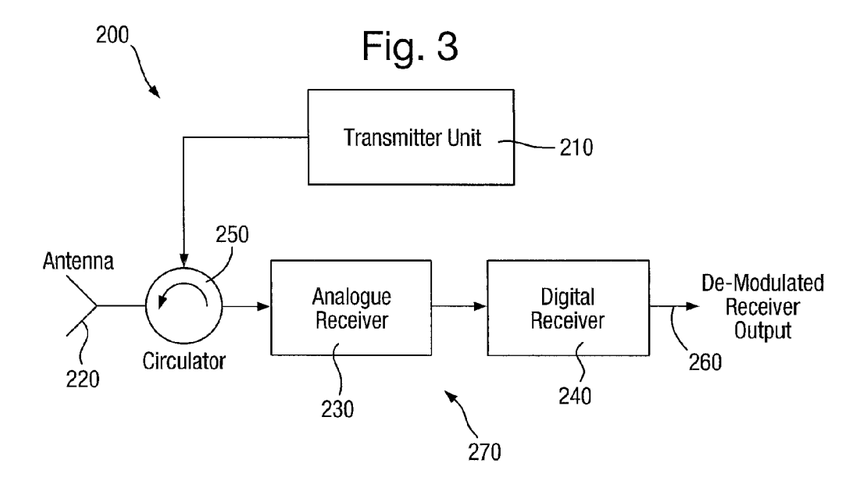
FIG. 3 is a block diagram of a radar system that is an example embodiment of an aspect of the present invention.

In an example embodiment of the invention shown in FIG. 3, a monopulse radar apparatus 200 includes a transmitter unit 210, an antenna 220, an analogue receiver 230 and a digital receiver 240. Radar signals to be transmitted are generated in the transmitter unit 210 and fed to the antenna 220, via a circulator 250. Radar echoes are received by the antenna 220 and pass through the circulator 250 to the analogue receiver 230. The analogue echo signal is converted into a digital signal which is processed in the digital receiver 240. The digital receiver 240 provides a digital de-modulated receiver output 260.

Thus, the digital receiver 240 forms the rear section of a complete receiving system 270, comprising analogue and digital sections. The analogue section of the receiving system 270 is a superheterodyne system which down-converts the received RF signal to a lower, analogue, intermediate frequency (IF), and provides amplification and filtering to reduce the noise power at frequencies above the Nyquist frequency of the sample rate of the digital receiver 240. Specifically, the analogue receiver 230 includes an anti-aliasing and pulse-shaping filter. The purpose of this filter is to maximise the signal-to-noise ratio. The filter is broad enough to pass the main lobe of the single-pulse spectrum, in order to minimise pulse distortion, but at the same time provides at least 10 dB of rejection at the lower and upper Nyquist frequencies (borders of the 3rd Nyquist Zone in FIG. 5), in order to prevent noise aliasing (fold-over) from degrading the signal-to-noise ratio. In the case of phase-coded pulses used in this example embodiment, a Bessel filter is used in order to minimise the filter group delay, and thus minimise distortion of the phase code which was applied to the transmitted pulses. Thus, the 10 dB rejection points of the filter are determined by the Nyquist frequencies, which in turn are determined by the sample rate of the ADC 300A-D in the digital receiver 240.

Figure 4:
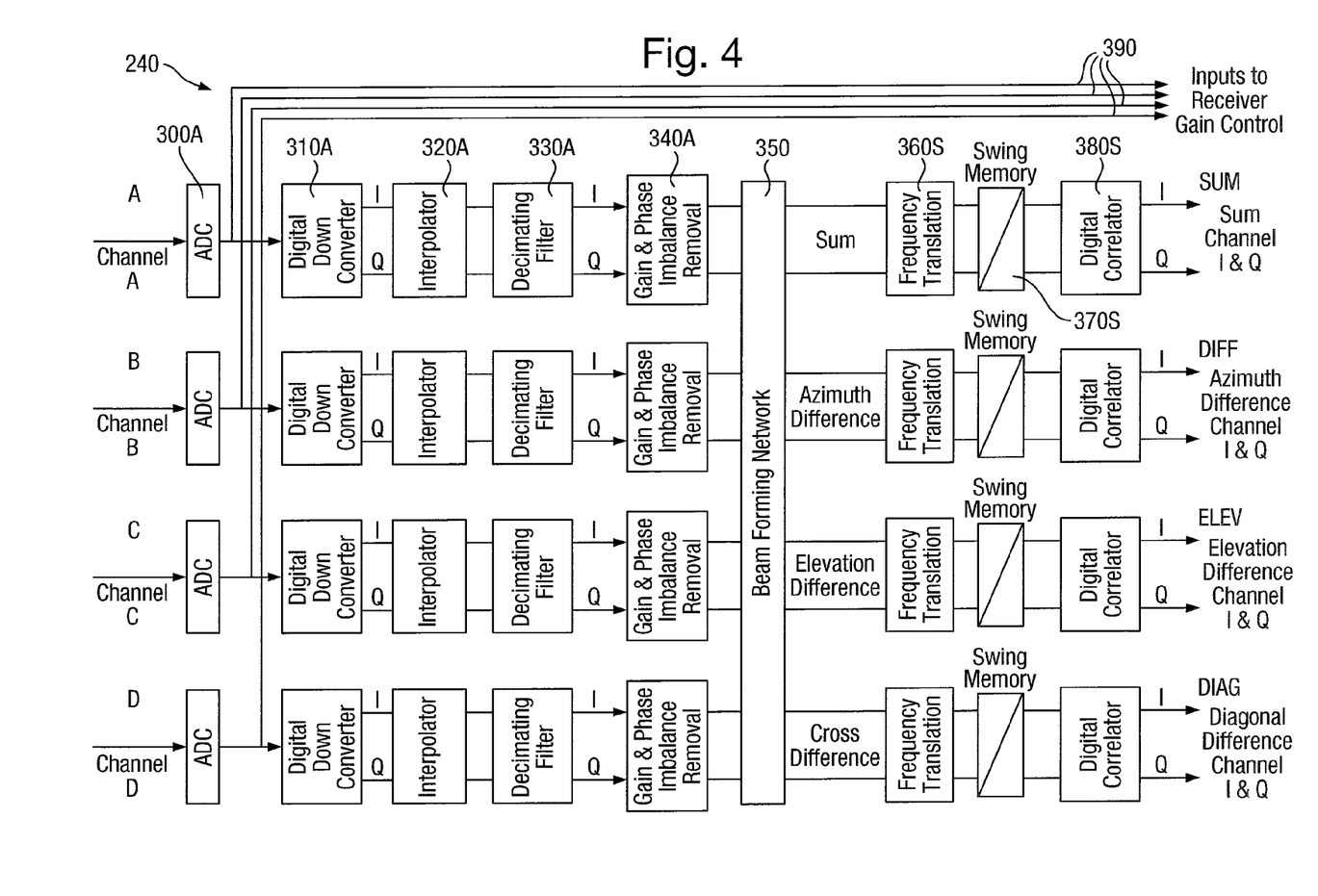
FIG. 4 is a block diagram of a digital receiver that is an example embodiment of an aspect of the present invention.

The digital receiver 240 is shown in more detail in FIG. 4. The analogue receiver 230 provides the IF analogue signal derived from the echo signal received on the antenna 220 on each of four channels A-D (Channels A-D are not shown separately in the schematic diagram of FIG. 1). Each channel A-D is processed similarly up to a beam-forming network 350, which generates sum, azimuthal difference, elevation difference, and diagonal difference signals, each of which is then further processed in its own channel SUM, DIFF, ELEV, DIAG.

Taking channel A as an example, the analogue channel A signal from the analogue receiver is converted to a digital signal in an analogue-digital converter (ADC) 300A, which is configured to under-sample the analogue signal and thereby to produce at least one aliased digital signal, which is selected by a filter. The selected IF digital signal is reduced to baseband and split into I and Q channels in a demodulator in the form of a digital down-converter 310A. The I and Q baseband signals then pass through a digital interpolator 320A, which removes spurious 0s, which arise from the down-conversion process, then a digital filter 330A, which is configured to reduce the bit rate of the IF digital signal and then a digital gain and phase rebalancer 340A. Between the ADC 300A and the digital down converter 310A, the signal is tapped to provide a copy 390 to the receiver gain control.

The analogue channels B to D signals from the analogue receiver are processed in the same way as the analogue channel A signal, and have the same components to this point.

The beam-forming network 350 combines the signals from channels A to D to produce the signals on the SUM, DIFF, ELEV, and DIAG channels, as discussed above. Taking the SUM channel as an example, the SUM I & Q signals from the beam forming network 350 are corrected for Doppler effects in frequency translator 360S and then pass into swing memory 370S and a digital correlator 380S, which produces a compressed pulse of the kind shown in FIG. 2(c).

The signals on the DIFF, ELEV, and DIAG channels, once formed, are processed in the same way.

Elements of the digital receiver 240 will now be discussed in further detail.

Figure 5:
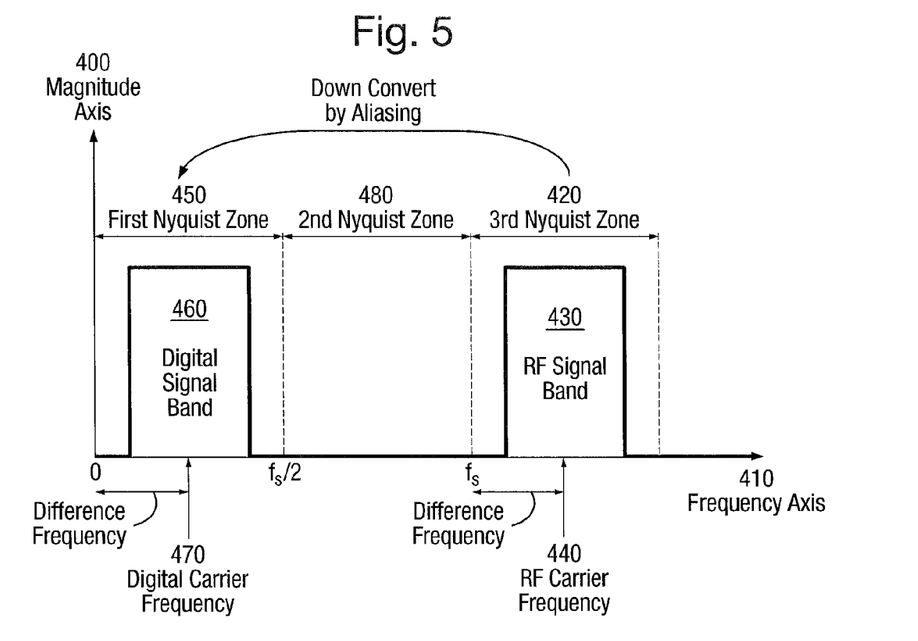
FIG. 5 is a schematic illustration of the frequencies of signals occurring in the operation of the digital receiver of FIG. 4.

The ADCs 300A-D are 12-bit 250 MHz class devices, which is sufficient to allow in principle for the signal bandwidth to be sampled within the normal Nyquist sampling rule (i.e. at a sample rate more than twice the signal bandwidth). However, it has been found that, if the carrier frequency of the analogue intermediate signal at the output of the analogue receiver 230 were to obey the Nyquist rule, then the carrier frequency would be so low that it would result in impractical requirements in the specification of band-pass filters needed in the analogue receiver 230. Increasing the sample rate of the ADCs 300A-D is not a practical option, since in this example embodiment at least 12 bits of dynamic range is needed from the ADCs 300A-D, and ADC technology for this category of device is still limited to sample rates below about 300 MHz. That problem is solved by increasing the carrier frequency so that the carrier frequency is under-sampled by the ADCs 300A-D, according to the Nyquist rule. Undersampling results in aliasing, but the aliasing is exploited: the aliasing results in an alias copy of the signal being produced in the digital sample stream at a (lower) frequency that is within the Nyquist rule. The frequency plan is illustrated in FIG. 5, in which $f_s$ is the ADC sample frequency. The figure shows signal magnitude 400 schematically against frequency 410. Three of the Nyquist zones 420, 450, 480 are shown. The RF signal band 430 is in the $3^{rd}$ Nyquist zone 420, at the analogue RF carrier frequency 440. The carrier frequency 440 is set so that the difference between the carrier frequency 440 and the ADC sample frequency $f_s$ is the same as the desired digital carrier frequency 470. The aliasing phenomenon causes multiple copies of the analogue signal to appear across the frequency spectrum, and the desired copy 460 is that within the first Nyquist zone 450. Thus, the system uses the ADCs 300A-D as frequency down-converters.

Figure 6:
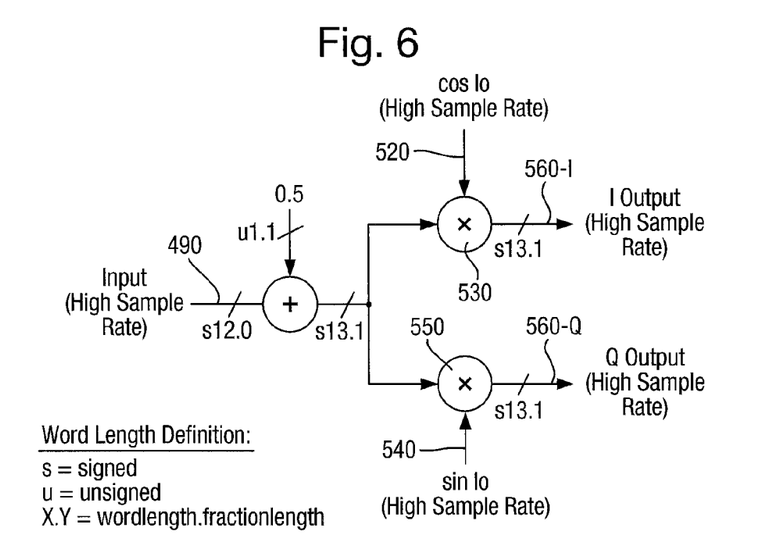
FIG. 6 is a block diagram of digital in-phase and quadrature demodulator forming part of the digital receiver of FIG. 4.

The digital samples from the ADCs 300A-D are next processed to extract the desired signal from the modulated carrier signal. The first stage is to produce the in-phase and quadrature signals. That is accomplished by splitting the data stream into two paths and then multiplying one path by a sine function, and the other path by a cosine function. That is illustrated in FIG. 6. The digital sampled input signal 490 enters the digital in-phase and quadrature demodulator 500. Its level is raised by 0.5 of one ADC least significant bit at an adder, in order to remove the inherent offset introduced by the rounding-down operation of the ADC, 510 and then the raised signal is split into first and second portions. The first portion is multiplied in a first multiplier 530 with a cosine signal from a first local oscillator 520 to produce the in-phase output signal 560-I, and the second portion is multiplied with a sine signal 540 from a second local oscillator 550 to produce the quadrature output signal 560-Q. (The sine and cosine signals are from digital local oscillators 520, 540 that are 90° out of phase with each other.)

In order to avoid introduction of spurious signals caused by inaccuracies in the digital representation of the sine and cosine functions, the carrier frequency of the digital signal 490 is chosen so that the sine and cosine functions only require samples at the peak of the sine or cosine function (i.e. samples of value 1 or −1) and at the zero crossing points (i.e. samples of value 0). That allows the sine and cosine functions to be represented by a stream of 1s, −1s, and 0s and eliminates the need to calculate the sine or cosine function (e.g. by an equation or a look-up table), thus also avoiding the errors caused by finite word lengths in the digital processor during such a calculation. The receiver 240 thereby achieves a clean final down-conversion to baseband without the introduction of spurious signals.

(Note that this rule sets the carrier frequency of the signal after analogue to digital conversion to exactly ¼ of the ADC sample rate. Due to the need to arrive at a single complex (I & Q) sample for each information bit of the phase code applied to the analogue pulse 120, this means that the phase modulation frequency, the ADC sample rate, the analogue IF carrier frequency, and the decimation ratio of the digital receiver (decimation is discussed further below) are all locked together by the following rules:

a) $\dfrac{f_s}{f_{lo}} = 4$ where $f_s$=ADC sample frequency, $f_{lo}$=digital local oscillator frequency;

b) $f_{IF}=f_{lo}(4n+1)$ where $f_{IF}$=IF carrier frequency, n=any integer; and c) $f_s\tau=m$ where $\tau$=phase code digit duration, m=integer and m>4 to ensure sufficient guard-bands after analogue to digital conversion to ensure that the final analogue filter has sufficient roll-off to ensure adequate rejection of fold-over noise.

Figure 7:
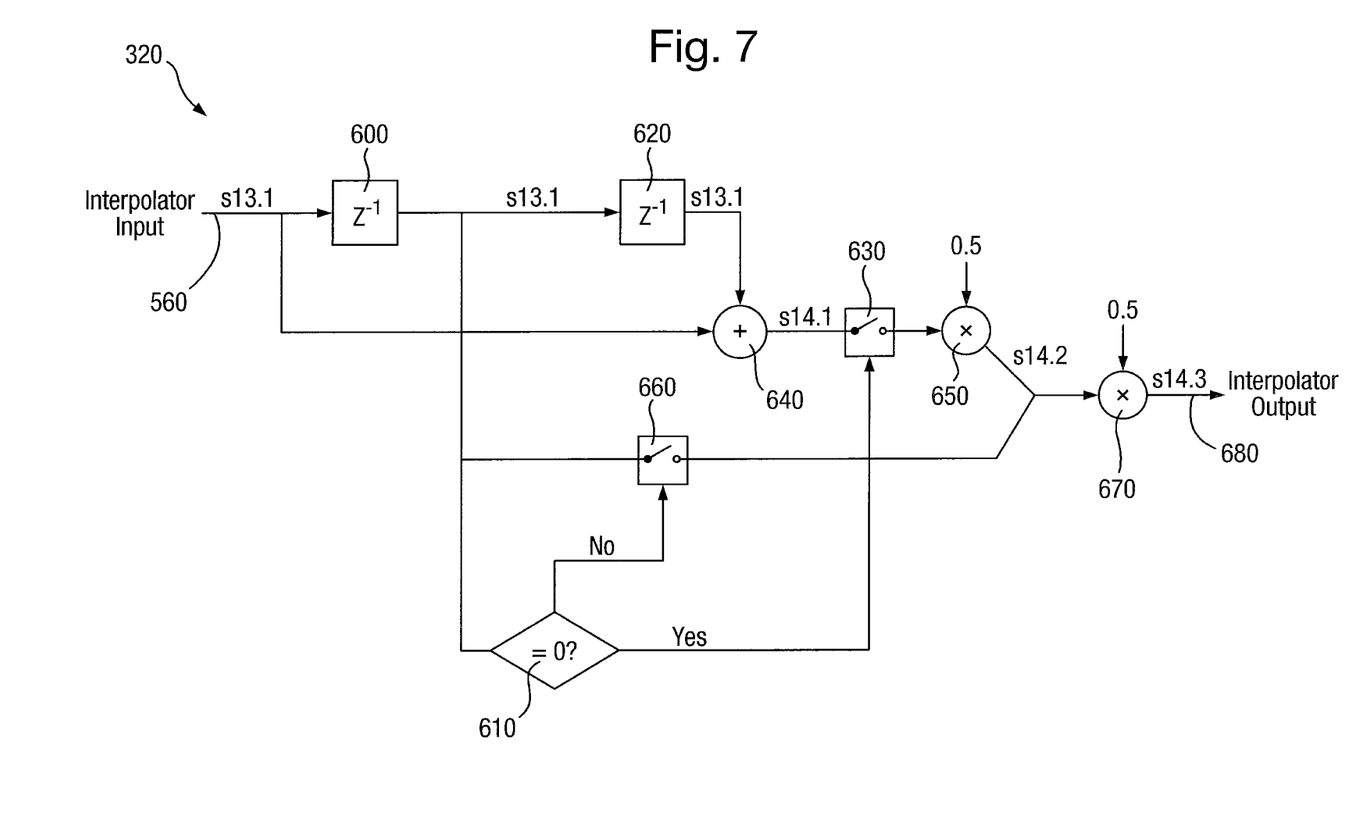
FIG. 7 is a block diagram of a digital interpolator forming part of the digital receiver of FIG. 4.

The final I & Q down conversion process of FIG. 6 produces the desired signal at baseband but also an unwanted sideband with a carrier frequency which is the sum of the local oscillator 520, 540 frequency and the signal carrier frequency after the ADC down-conversion. That unwanted sideband is removed by a low-pass filtering process. Due to the method, discussed above, of implementing the sine and cosine functions as streams of 1s and 0s, the resulting signal has every alternate sample equal to zero. In this example embodiment, the low-pass filtering is implemented using a digital interpolator 320 (FIG. 7): low-pass filtering of the down-converted signal 560 has the effect of raising every zero sample to the mean level of the neighbouring samples, i.e. it implements an interpolation function. The I and Q channels are each processed in the same way. The interpolator input stream (at present bit, say, n) is received by a delay 600 which stores the (n−1th) bit in the stream. A zero-tester 610 receives the (n−1)th bit from the unit interval delay 600 at the sampling frequency and determines whether the (n−1)th bit is a zero. If it is a zero, a first switch 630 allows through a signal, from an adder 640, which is the sum of the nth bit in the stream and the (n−2)th bit in the stream (obtained from a further unit interval delay 620 downstream of the first delay 600). The signal allowed through by the switch 630 is then halved at a multiplier 650, to provide a signal having the mean value of the nth and the (n−2)th bits in the data stream. If, on the other hand, the (n−1th) bit is not zero, a second switch 660 allows through the value of the (n−1)th bit. Only one of the first switch and the second switch allows a bit through. Either the mean value of the nth and the (n−2)th bits from multiplier 650 (if the (n−1)th bit is zero) or the value of the (n−1)th bit (if the (n−1)th bit is not zero) is thus passed on to the next element in the interpolator 320, which is a further multiplier 670, which halves the value of the received bit to provide the interpolator output 680. The multiplication by ½ is added in order to give the same signal amplitude as the equivalent low-pass digital filter which rejects the upper sideband, thereby resulting in a halving of the signal amplitude.

Figure 8:
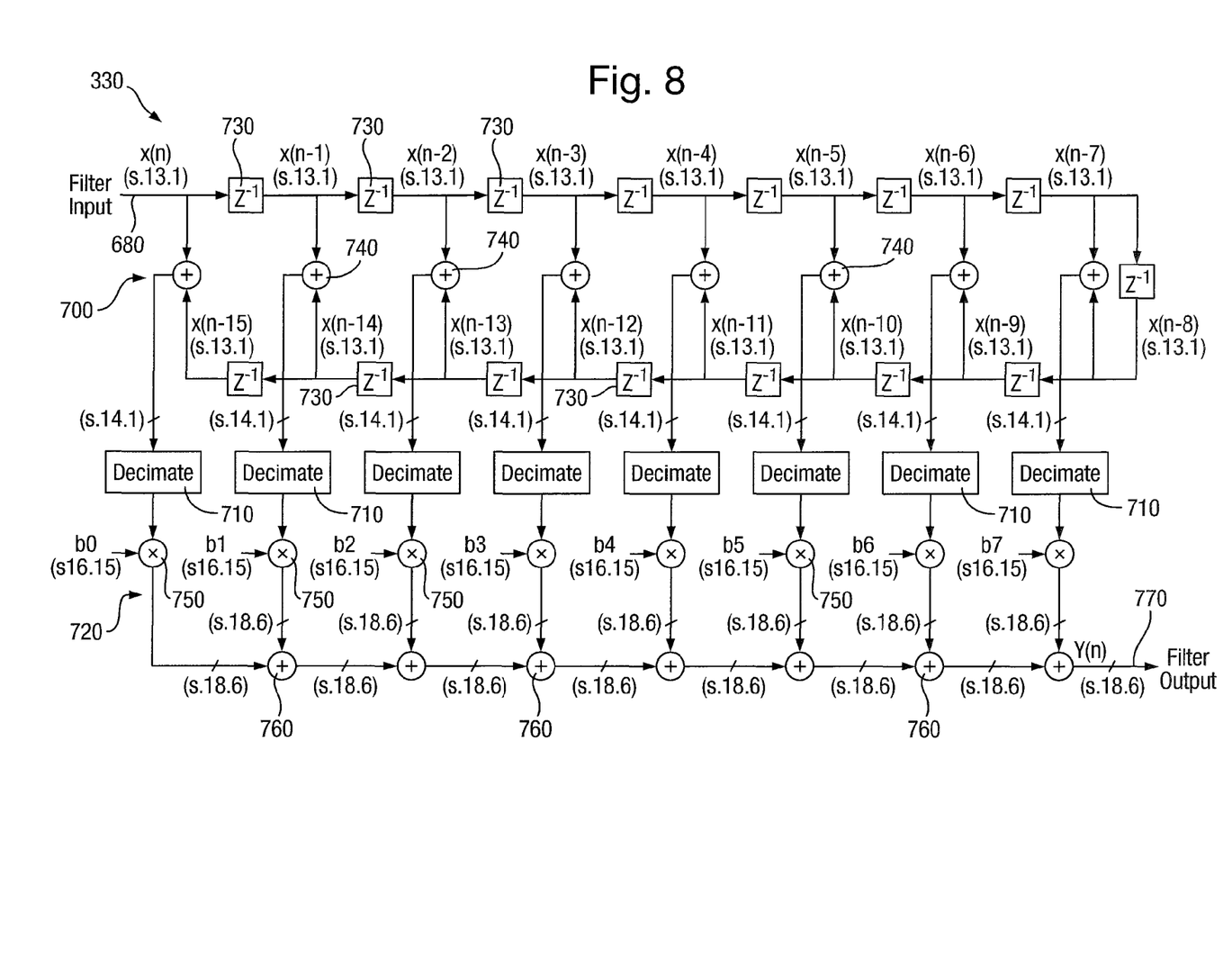
FIG. 8 is a block diagram of a decimating low-pass filter forming part of the digital receiver of FIG. 4.

The interpolator output 680 is the desired phase code (i.e. the phase code applied to the transmitted pulse), but with a high sample rate. In order to perform the digital pulse compression, the digital correlator requires a single complex sample for each digit of the phase code applied to the transmitted pulse; thus, the sample rate needs to be reduced from the high sample rate of the ADCs 300 A-D to a rate providing one sample per phase-code digit. That is achieved in a decimating low pass filter which reduces the sample rate by the factor m in rule (c) above. This filter is implemented as a symmetrical Finite-Impulse-Response (FIR) filter 330 (FIG. 8).

The FIR filter 330 includes a folded delay-line structure 700, a plurality of decimators 710 and a summing line 720 which adds together the decimated signal bits weighted by the filter response co-efficients.

The folded delay line structure 700 comprises, in this example, 15 delays 730 and 8 adders 740. The adders 740 are arranged between pairs of delays 730, such that they add the nth samples of the interpolator output 680 and the (n−15)th samples together, the (n−1)th samples and the (n−14)th samples together, the (n−2)th samples and the (n−13)th samples together, and so on. The 8 summed samples from the 8 adders 740 are each passed to one of 8 decimators 710, which discard samples to provide the required decimation factor m (e.g., for a decimation factor m=8, pairs of samples in the interpolator output 680 have already been combined, and so only every 4$^{th}$ sample is retained by the decimators 710). The output from each of the eight decimators is weighted by its respective filter co-efficient in a multiplier 750, and the resulting weighted sample streams are combined by adders 760 to provide a filter output 770.

The filter coefficients are chosen to produce a low-pass filter with a raised-cosine passband shape. The decimating filter 330 has a dual function: to provide filtering of noise to prevent noise fold-over into the signal band after sample rate reduction, and to provide the optimum shape of the demodulated phase code. It has been found that a raised cosine filter provides a good shape of the phase coded pulses with little ringing at each change of phase.

After this final filtering, by discarding all intermediate samples, the sample rate has been reduced to that required by the digital correlator 380. There is a decimating FIR filter in both the I and the Q channel.

The next stage of the processing is to form sum and difference beams. However, before this can be done the four channels A-D need to be corrected for gain and phase imbalance imposed by the analogue sections of the receiver 270. This is done by multiplying the signal in each channel A-D by a rescaling factor, and rotating the phase of each channel by a complex phase rotation in order to bring all four channels into phase and gain alignment.

Figure 9:
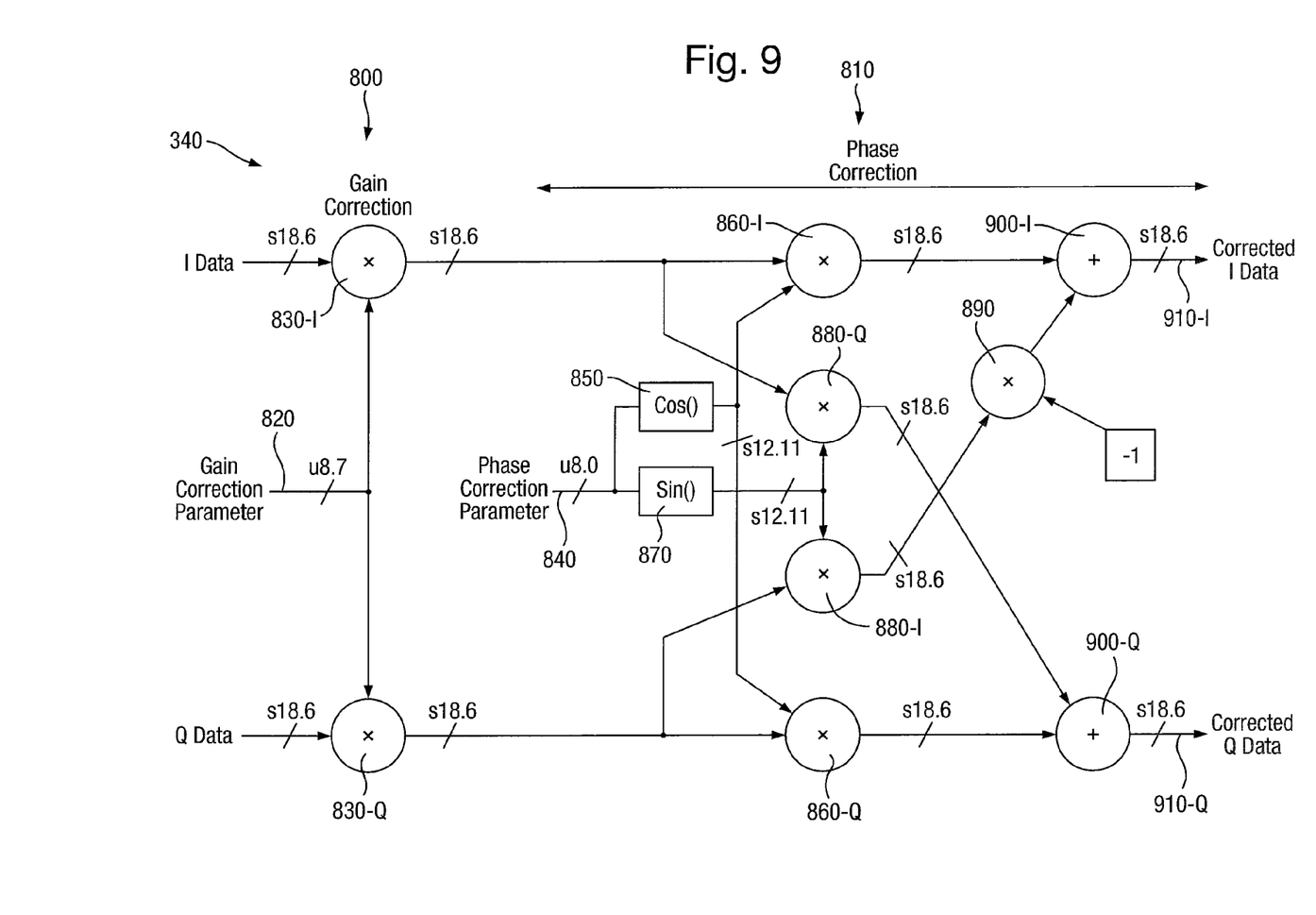
FIG. 9 is a block diagram of phase and gain-imbalance removal arrangement forming part of the digital receiver of FIG. 4.

This stage is shown in greater detail in FIG. 9. The gain and phase re-balancer 340 provides a multiplication by the gain correction rescaling factor 800 in a gain-correction sub-stage 800, followed by a complex multiplication to affect a phase rotation in a phase-correction sub-stage 810. The gain correction factor 820 and the phase correction factor 840 are calculated by a microprocessor.

In the gain correction sub-stage 800, a gain correction parameter is applied to both the in-phase data stream and the quadrature data stream by respective gain-correction multipliers 830-I, 830-Q.

The phase-correction is achieved by complex multiplication, specifically $$\begin{pmatrix} S'_I \\ S'_Q \end{pmatrix} = \begin{pmatrix} \cos(\Delta\varphi) & -\sin(\Delta\varphi) \\ \sin(\Delta\varphi) & \cos(\Delta\varphi) \end{pmatrix} \begin{pmatrix} S_I \\ S_Q \end{pmatrix},$$

where $S_I$ and $S_Q$ are the gain-corrected but phase-distorted in-phase and quadrature components, $S_I'$ and $S_Q'$ are the gain-corrected and phase-corrected in-phase and quadrature components, and $\Delta\varphi$ is the phase-correction factor. In the implementation of that matrix multiplication in the phase-correction sub-stage 810, a phase correction parameter 840 is calculated and its cosine calculated in cosine generator 850. The cosine of the phase-correction factor is applied to both the in-phase gain-corrected data stream and the quadrature gain-corrected data stream by respective first phase-correction multipliers 860-I, 860-Q. The sine of the phase-correction parameter 840 is calculated in sine generator 870. The sine of the phase-correction parameter is multiplied with the in-phase gain-corrected data stream (taken prior to first phase correction multiplier 860-I) in second phase-correction multiplier 880-Q and is then applied to the quadrature data stream in a phase-correction adder 900-Q. The sine of the phase-correction parameter is multiplied with the quadrature-phase gain-corrected data stream (taken prior to first phase correction multiplier 860-Q) in second phase-correction multiplier 880-I and is then multiplied by −1 in an inversion multiplier 890, before being applied to the in-phase data stream in a phase-correction adder 900-I. The gain correction sub-stage outputs corrected in-phase data stream 910-I and corrected quadrature data stream 910-Q.

Figure 10:
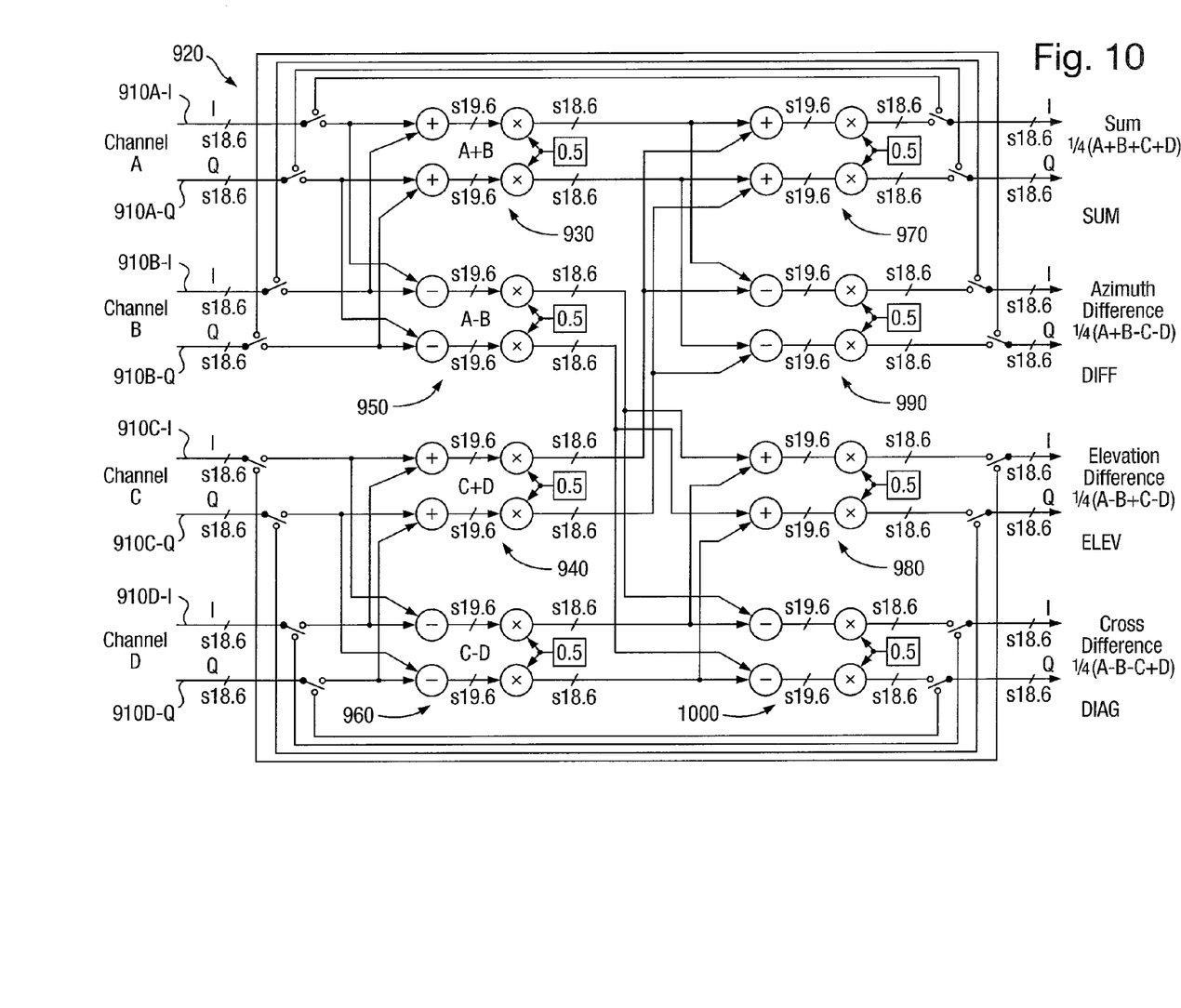
FIG. 10 is a block diagram of a beam-forming network forming part of the digital receiver of FIG. 4.

After correction of the gain and phase imbalance, the sum and difference beams can be formed in the beam-forming calculation. This is simply a summing and differencing network 920 to produce a summation and the required differences of the four receiver channels. This is shown in greater detail in FIG. 10. Specifically, the network 920 includes A+B summing unit 930, in which, on the in-phase and also the quadrature signals, the channel A signal and the channel B signal are added together and then the result is halved; similarly, in C+D summing unit 940, the channel C signal and the channel D signal are added together and then the result is halved. The network 920 also includes A-B difference unit 950, in which the channel B signal is subtracted from the channel A signal and then the result is halved, and C-D difference unit 960, in which the channel D signal is subtracted from the channel C signal and the result is halved. The result of the calculations of the A+B unit 930 and C+D unit 940 are added together in SUM summing unit 970 to produce the SUM signal ¼(A+B+C+D). The result of the calculations of the A-B unit 950 and C-D unit 960 are added together in ELEV summing unit 980 to produce the elevation difference ELEV signal ¼(A−B+C−D). The result of the calculations of the C+D unit 940 are subtracted from the result of the A+B unit 930 in the DIFF difference unit 990 to produce the azimuthal difference DIFF signal ¼(A+B−C−D). The result of the calculations of the C-D unit 960 are subtracted from the result of the A-B unit 950 in the DIAG difference unit 100 to produce the cross difference DIAG signal ¼(A−B−C+D).

Figure 11:
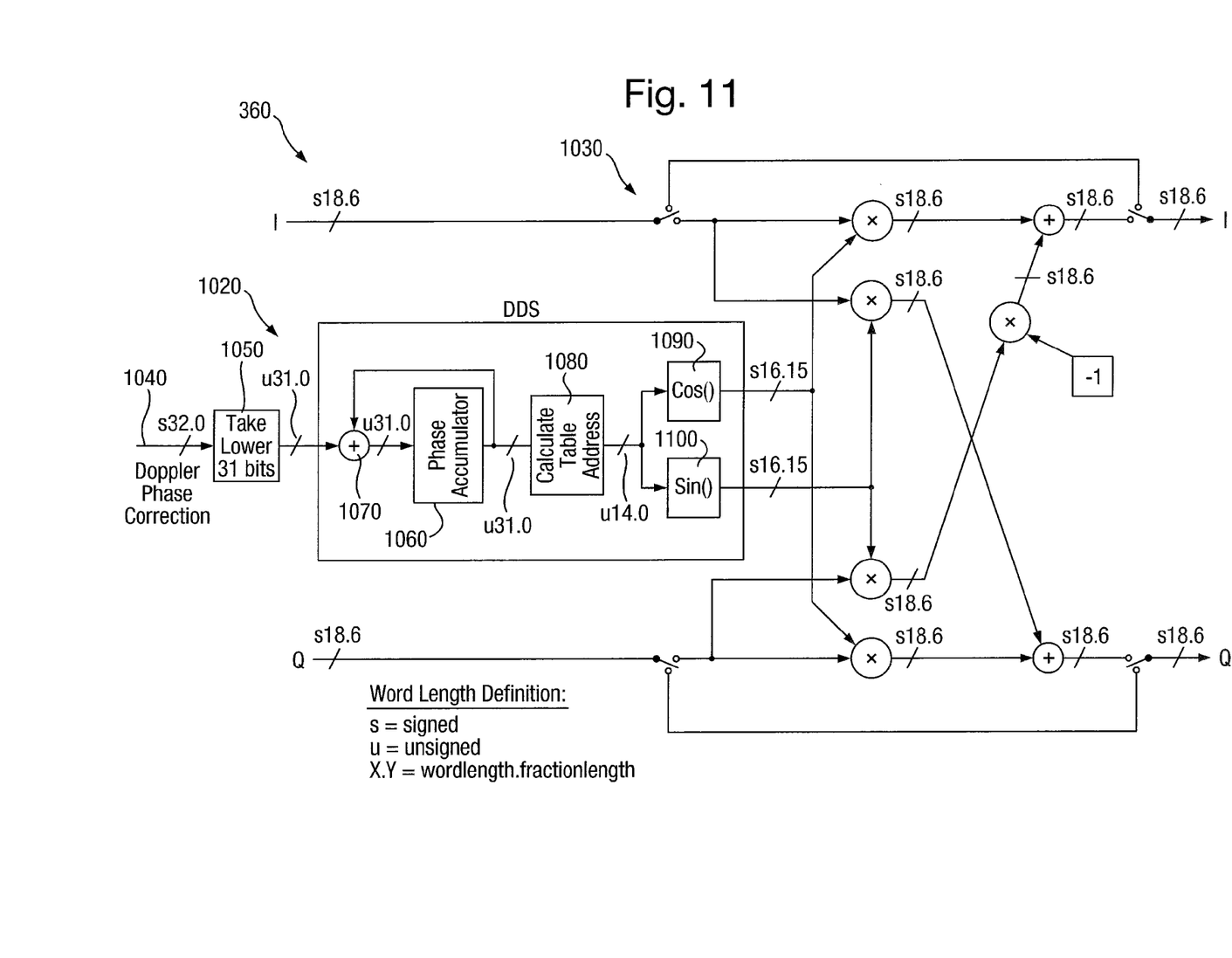
FIG. 11 is a block diagram of a Doppler frequency removal arrangement forming part of the digital receiver of FIG. 4.

After the beam-forming calculation, a frequency translation stage 360 is included in each channel SUM, DIFF, ELEV, DIAG to allow the removal of any Doppler shift on the signal. A block diagram of this process is shown in FIG. 11. This stage 360 is required because the digital correlator 380 acts as a low pass filter in the frequency domain, and will impose signal loss if the signal contains any significant A.C. component.

The Doppler removal frequency translation stage 360 includes a Doppler correction parameter generation sub-stage 1020, which generates a Doppler correction parameter to be applied to the in-phase channel and the quadrature channel. The correction parameter is applied in a Doppler-phase-correction sub-stage 1030 of the same general form as the phase-correction sub-stage 810 shown in FIG. 9 and described above, save that the Doppler correction parameter is applied to the I and Q channels in place of the phase correction parameter 840. In the Doppler-shift calculation sub-stage 1020, a calculated Doppler phase increment 1040 is supplied to the sub-stage. If the Doppler phase increment is represented by the 2's compliment numeric format, the sign bit can be ignored, since the magnitude of the required phase increment is represented by the magnitude portion of the 2's compliment number. Thus the lower 31 bits are taken, in a unit 1050. The signal is fed into a phase accumulator 1060 in which the latest phase increment is added to the current value stored in the accumulator register. The phase accumulator register thus holds the current value of the local oscillator signal phase. This signal phase value is used to form the address of a cosine look-up table 1090 and a sine look-up table 1100. The calculated cosine and sine are applied to the in-phase and quadrature signals in the Doppler-phase-correction sub-stage 1030, in the manner described in relation to the phase correction parameter 840 above.

In contrast to the I & Q mixing stage 500 described earlier, in this frequency translation stage 360, there is no opportunity to use a clean local oscillator. Thus the word length and accuracy of the process used to generate the sine and cosine functions to form the complex local oscillator need careful treatment to avoid the injection of spurious frequency components.

Due to the fact that the cross-correlation function is performed in the time domain, and due to the mathematical definition of cross-correlation as being a sliding function, sliding one data set over another and multiplying the two together at each step of the slide, the output from the frequency translation process 360 needs to be collected into a memory because the cross-correlation function requires a complete set of data collected during a single radar pulse interval before it can proceed. In order to avoid loss of radar data on every alternate radar pulse, this needs to be a swing memory, so that new data can be stored in one half of the memory while data is read out from the other half.

The final stage of the signal demodulation is to form the cross-correlation function between the phase code applied to the transmitted pulses, and the received echo signal. This is performed in a digital correlator 380 which implements the process:

for each input sample number x:

$$\text{output } A(x) = \sum_{n=0}^{N-1} C_n S_{x+n}$$

where $S_m$=input sample
$C_n$=phase code value (+1 or −1)
N=phase code length

The digital correlator is applied in the same way to the I and Q channels.

This then completes the signal de-modulation, and the output from the system will have the appearance of a compressed pulse of the form shown in FIG. 2(c).

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may be absent in other embodiments.

The invention claimed is:
1. A radar receiver comprising:
an analogue receiver unit for receiving a radar echo signal and arranged to convert the radar echo signal into an intermediate frequency (IF) analogue signal;

a digital receiver including an analogue-to-digital converter arranged to receive the IF analogue signal from the analogue receiver and to sample the IF analogue signal, wherein the sampling by the analogue-to-digital converter is undersampling according to the Nyquist criterion, so that a plurality of IF digital signals are produced, in different Nyquist zones, including one or more aliased IF digital signals, the digital receiver being arranged to select an IF digital signal from the one or more aliased digital signals;

a digital demodulator arranged to convert the selected IF digital signal to a baseband digital signal having in-phase (I) and quadrature (Q) components, and the I and Q components are produced by multiplying the selected IF digital signal by a cosine signal and by a sine signal, respectively, each represented by a stream consisting only of three levels; and a digital beam-forming network arranged to receive a plurality of baseband digital signals from each of a plurality of receiver channels, and to convert the plurality of baseband digital signals into a plurality of comparison signals each on one of a plurality of comparison channels, wherein each comparison channel includes a digital frequency translation unit configured to remove or reduce any Doppler shift on a corresponding one of the plurality of comparison signals, and wherein a carrier frequency of the selected IF digital signal is ¼ of a sampling frequency of the analogue-to-digital converter in sampling the IF analogue signal.

2. The radar receiver as claimed in claim 1, in which a difference between a carrier frequency of the IF analogue signal and the sampling frequency of the analogue-to-digital converter is the same as the carrier frequency of the selected IF digital signal, so that the selected digital signal is in a first Nyquist zone of the different Nyquist zones.

3. The radar receiver as claimed in claim 1, wherein the three levels correspond to maxima, minima, and zeros of the cosine and sine signals, respectively.

4. The radar receiver as claimed in claim 1, further comprising a digital filter arranged to reduce a bit rate of the baseband digital signal.

5. The radar receiver as claimed in claim 4, in which the digital filter arranged to reduce the bit rate is configured to implement a passband having a raised cosine shape.

6. The radar receiver as claimed in claim 1, further comprising a digital interpolator configured to calculate by interpolation, a substitute value for bits in the baseband digital signal, having a zero value resulting from the sampling.

7. The radar receiver as claimed in claim 6, wherein the digital interpolator is configured to function as a low-pass filter.

8. The radar receiver as claimed in claim 1, further comprising a digital balancer configured to remove or reduce gain and/or phase imbalance in the baseband digital signal.

9. The radar receiver as claimed in claim 1, wherein each comparison channel includes a digital correlator arranged to form a cross-correlation function between the corresponding one of the plurality of comparison signals and a code applied to pulses transmitted by the radar receiver.

10. The radar receiver as claimed claim 1, being a pulse-Doppler radar receiver, a monopulse radar receiver, and/or a radar receiver using phase-coded pulse compression.

11. A method of processing a radar signal, comprising:
receiving a radar echo signal and converting the radar echo signal into an intermediate frequency (IF) analogue signal; and sampling the IF analogue signal, wherein the sampling is undersampling according to the Nyquist criterion, so that one or more aliased IF digital signals is produced;

selecting an IF digital signal from the one or more aliased digital signals;

converting the selected IF digital signal to a baseband digital signal having in-phase (I) and quadrature (Q) components, the I and Q components being produced by multiplying the selected IF digital signal by a cosine signal and by a sine signal, respectively, each represented by a stream consisting only of three levels;

receiving a plurality of baseband digital signals from each of a plurality of receiver channels;

converting the plurality of baseband digital signals into a plurality of comparison signals each on one of a plurality of comparison channels; and removing or reducing any Doppler shift on a corresponding one of the plurality of comparison signals using a digital frequency translation unit included in each comparison channel, wherein a carrier frequency of the selected IF digital signal is ¼ of a sampling frequency of the analogue-to-digital converter in sampling the IF analogue signal.

12. The method of processing a radar signal as claimed in claim 11, wherein the three levels correspond to maxima, minima, and zeros of the cosine and sine signals, respectively.

13. A radar receiver comprising:
an analogue receiver unit for receiving a radar echo signal and arranged to convert the radar echo signal into an intermediate frequency (IF) analogue signal;

a digital receiver including an analogue-to-digital converter arranged to receive the IF analogue signal from the analogue receiver and to sample the IF analogue signal, wherein the sampling by the analogue-to-digital converter is undersampling according to the Nyquist criterion, so that a plurality of IF digital signals are produced, in different Nyquist zones, including one or more aliased IF digital signals, the digital receiver being arranged to select an IF digital signal from the one or more aliased digital signals;

a digital demodulator arranged to convert the selected IF digital signal to a baseband digital signal having in-phase (I) and quadrature (Q) components, and the I and Q components are produced by multiplying the selected IF digital signal by a cosine signal and by a sine signal, respectively, each represented by a stream consisting only of three levels; and a digital beam-forming network arranged to receive a plurality of baseband digital signals from each of a plurality of receiver channels, and to convert the plurality of baseband digital signals into a plurality of comparison signals each on one of a plurality of comparison channels, wherein each comparison channel includes a digital correlator arranged to form a cross-correlation function between a corresponding one of the comparison signals and a code applied to pulses transmitted by the radar receiver, and wherein a carrier frequency of the selected IF digital signal is ¼ of a sampling frequency of the analogue-to-digital converter in sampling the IF analogue signal.

* * * * *